Jan. 12, 1971  D. W. BRAMER ET AL  3,555,394
POWER PACK FOR PHOTOGRAPHIC FLASHLAMP
Filed Aug. 2, 1968  5 Sheets-Sheet 1
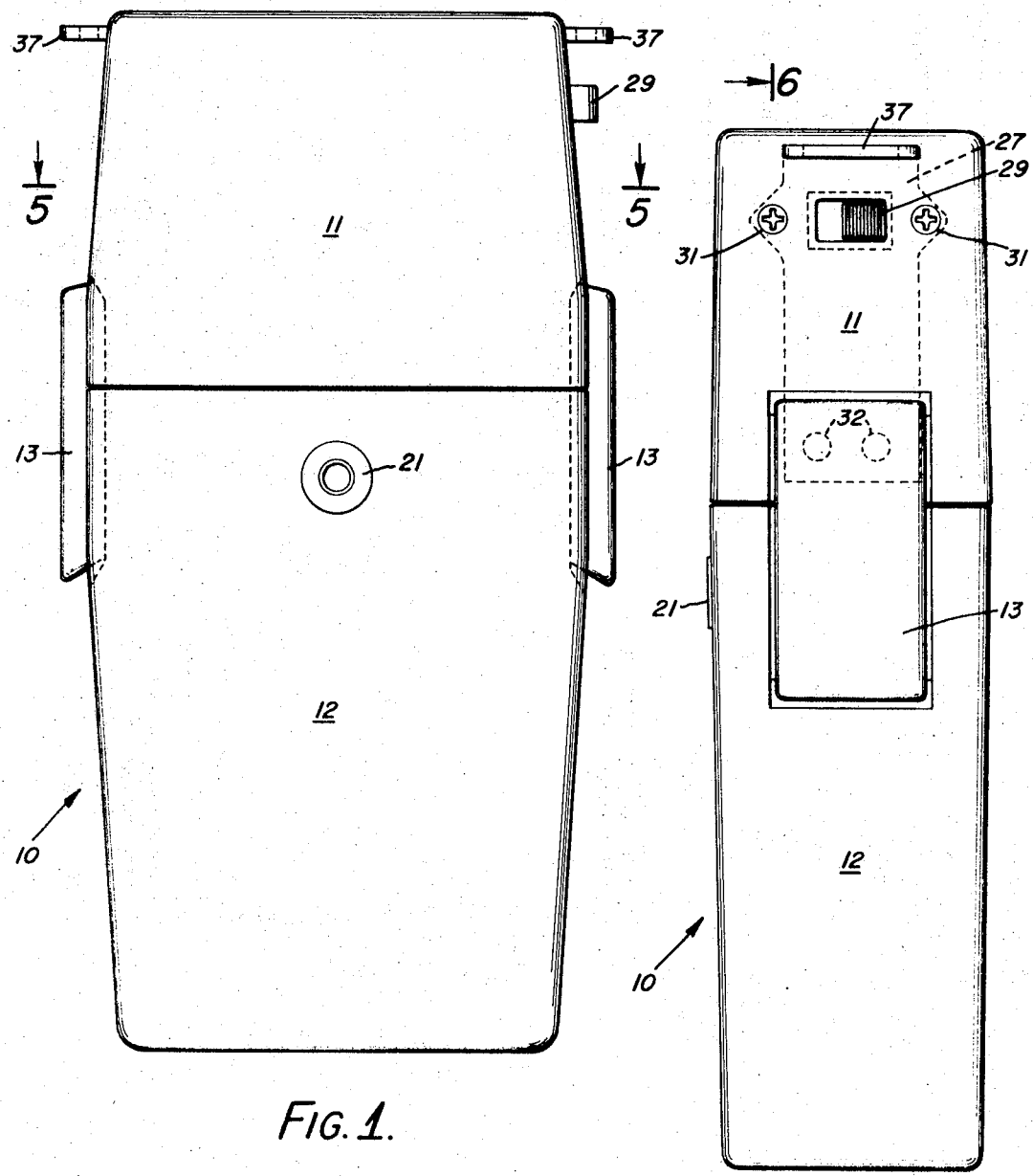
FIG. 1.
FIG. 2.
FIG. 4.
INVENTORS.
DONALD W. BRAMER
PAUL B. CLOCKSIN
BY
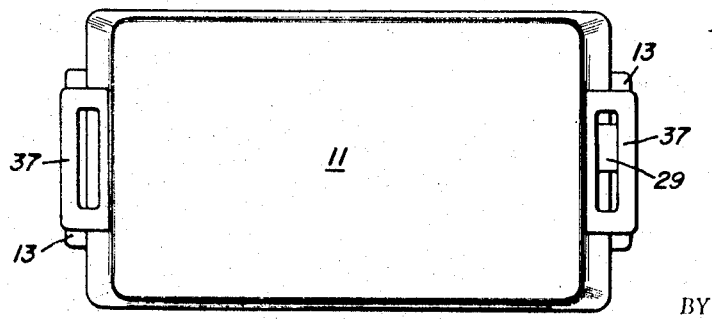
HIS ATTORNEY

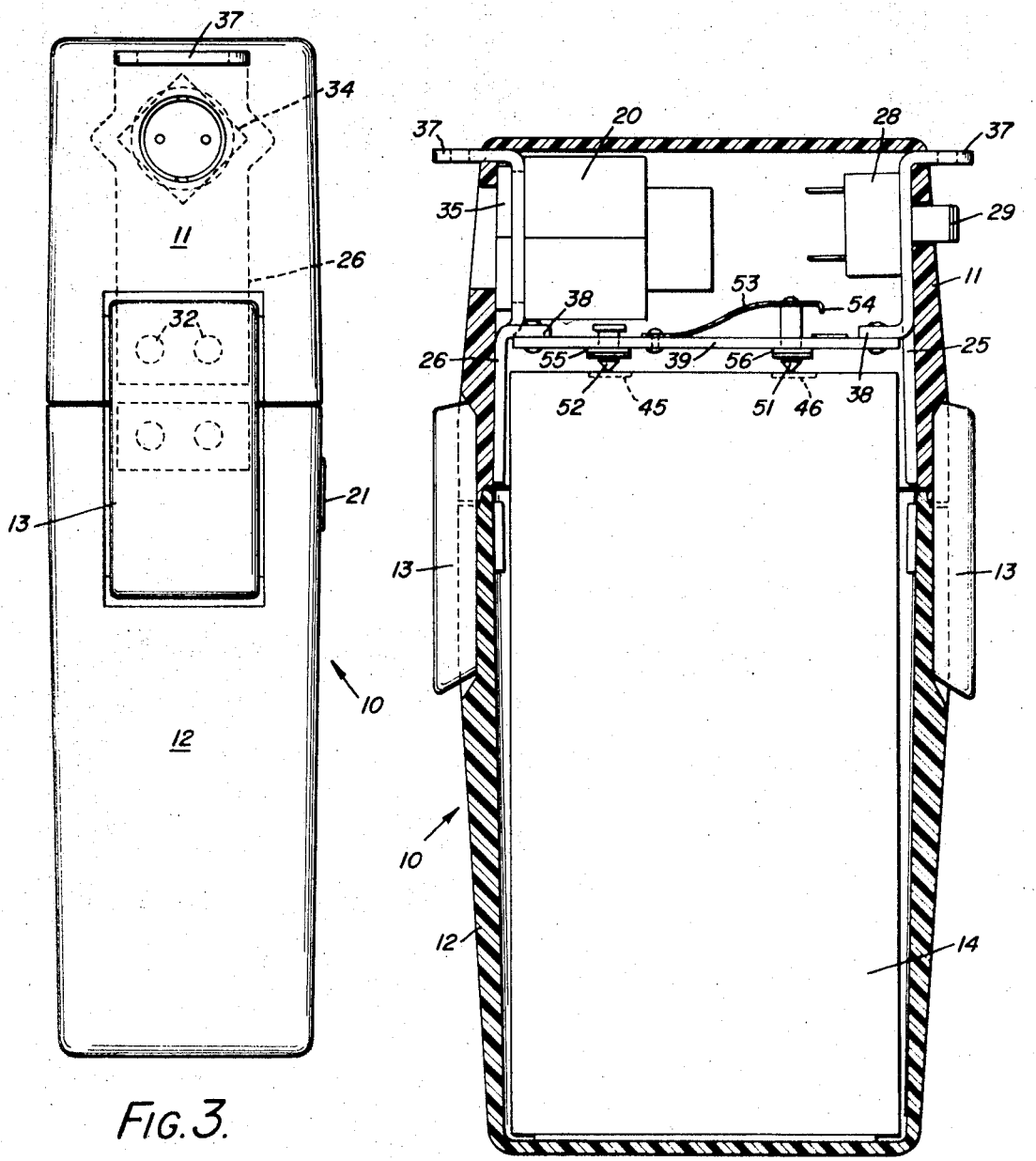
FIG. 3.
FIG. 6.
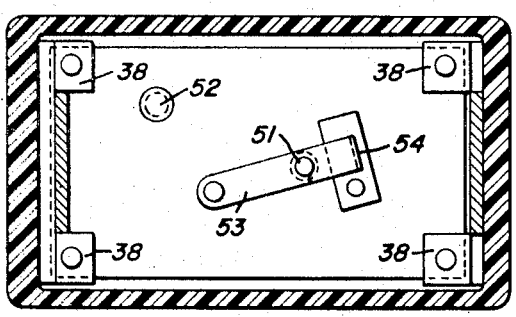
FIG. 5.
INVENTORS.
DONALD W. BRAMER
PAUL B. CLOCKSIN
BY
Cumpston, Shaw & Stephens
HIS ATTORNEY INVENTORS.
DONALD W. BRAMER
PAUL B. CLOCKSIN
BY
Crumpston, Shaw & Stephens
HIS ATTORNEY Jan. 12, 1971  D. W. BRAMER ET AL  3,555,394
POWER PACK FOR PHOTOGRAPHIC FLASHLAMP Filed Aug. 2, 1968  5 Sheets-Sheet 4

INVENTORS.
DONALD W. BRAMER
PAUL B. CLOCKSIN
BY
Crumpston, Shaw & Stephens
HIS ATTORNEY

United States Patent Office 3,555,394
Patented Jan. 12, 1971

3,555,394
POWER PACK FOR PHOTOGRAPHIC FLASHLAMP
Donald W. Bramer and Paul P. Clocksin, Rochester, N.Y., assignors to Graflex, Inc.
Filed Aug. 2, 1968, Ser. No. 749,711
Int. Cl. H02m 1/02; F21l 1/00
U.S. Cl. 320—1
13 Claims

ABSTRACT OF THE DISCLOSURE

A power pack for a photographic flashlamp having a storage capacitor includes a battery and control circuitry in separable portions of the case with the battery contacts arranged so that when the case is opened the battery is first disconnected from the control circuit and then a normally open switch is closed to connect a resistor across the capacitor to discharge it. The power pack also includes an "on" indicator lamp flashed by a relaxation oscillator and mechanical strength and convenience features in the case.

THE IMPROVEMENT EFFECTED

The relatively small and portable prior art power packs for photographic flashlamps with storage capacitors have been flimsy, inconvenient and unsafe. They have presented substantial shock hazards from the charged capacitor in the flashlamp if the lamp is unplugged from the power pack or the power pack opened to change the battery. Some of the previously known power packs have not even included an on-off switch, or any indication that the power pack was turned on, if an on-off switch was available. Also prior power packs have been awkward to carry or mount, unusable at remote locations, and generally inconvenient to work with.

The objects of this invention include, without limitation:

(a) Overcoming the deficiencies of prior art power packs;

(b) A photoflash power pack that is safe, free of shock hazard in any condition, and provides an attention-getting indication of the fact that the power pack is turned on;

(c) A rugged, strong, and convenient power pack that is easy to carry with either a shoulder strap or a belt clip; and (d) A power pack that can be conveniently connected to a flashlamp and flashlamp mounted to power pack for operation remote from the camera.

These and other objects of the invention will be apparent hereinafter from the specification which describes the invention, its use, operation, and preferred embodiment, from the drawing, which constitutes a part of the disclosure and from the subject matter claimed.

Generally some of the objects of the invention are accomplished by insuring capacitor discharge or charged contact inaccessibility for any possible condition. An on-off switch is arranged for discharging the capacitor when the switch is in the "off" position. A safety plug and socket having at least one inaccessible terminal insures that unplugging the lamp from the power pack will not leave any exposed terminals presenting a shock hazard. Also the battery contacts are arranged so that in opening the case the battery is first disconnected and then a mechanically biased contact allows a normally-open, capacitor-discharge switch to close for discharging the capacitor and making the battery contacts safe. Furthermore, an indicator lamp signals that the power pack is switched on, and the lamp is flashed by a relaxation oscillator to give a more effective visible signal and to economize in the energy required for the lamp.

These electrical features are incorporated in a rugged, two-piece case that is formed of strong molded plastic material, made water-resistant and includes strong latches for holding the case together. The case also includes a tripod socket for receiving an accessory belt clip to carry the case on the cameraman's belt. Brackets in the top portion of the case support the control circuitry and provide both latch anchors and carrying strap anchors for a rugged and simplified construction. The brackets also support and anchor the on-off switch and a socket receptacle for the flashlamp cord plug.

SUMMARY OF THE INVENTION

A power pack for a photographic flashlamp that has a storage capacitor and an electric cord for connection to the power pack includes: a case having separable top and bottom portions releasably latched together with a battery in the bottom portion and control circuitry in the top portion; contacts in the top portion arranged for engaging battery terminals when the case is closed; on the battery contacts being biased for substantial movement toward the battery relative to the other contact; a normally-open, capacitor-discharge switch when the case is opened; and a resistor arranged to be switched into the capacitor circuit by the capacitor-discharge switch for discharging the capacitor when the case is opened and the cord connects the flashlamp to the power pack.

DRAWINGS

FIGS. 1–4 show respective front, right end, left end, and top views of a preferred embodiment of the inventive power pack;

FIG. 5 is a cross section taken along the line 5—5 of FIG. 1;

FIG. 6 is a vertical cross section taken along the line 6—6 of FIG. 2;

DETAILED DESCRIPTION

The drawings show one preferred embodiment of the inventive power pack, but of course many variations can be made within the spirit of the invention; the illustrated embodiment is described in detail below to clarify the inventive concepts.

A case 10 is preferably molded of a strong, synthetic resin material and includes a top 11 and a bottom 12 that is continuous and fits tightly together with top 11 for moisture resistance. Latches 13 hold top 11 and bottom 12 securely together with battery 14 carried in bottom 12, and control circuitry described below is carried in top 11.

Figure 8:
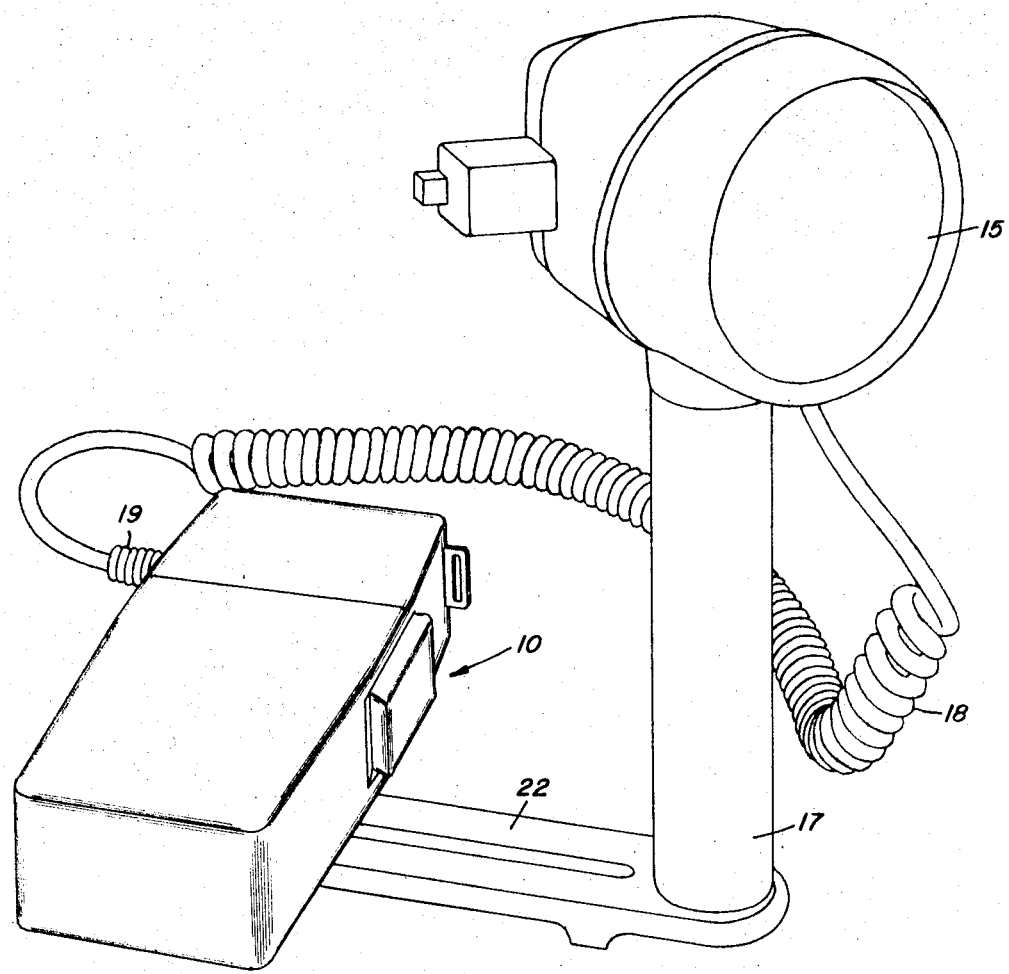
FIG. 8 is a perspective view of the inventive power pack coupled to a flashlamp for remote operation.
Figure 9:
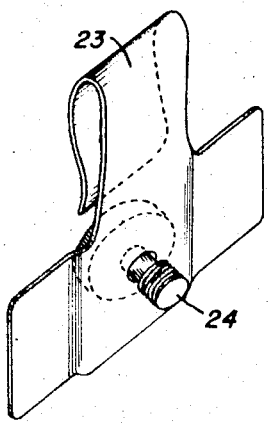
FIG. 9 is a perspective view of a belt clip for carrying the illustrated power pack.

A flashlamp 15 (FIG. 8) for use with the inventive power pack contains a storage capacitor 16 (FIGS. 10 and 11) in handle 17 and is connected to case 10 by an electric cord 18 terminating in a plug 19. A socket 20 in top 11 receives plug 19 in electrical connection with power pack circuitry.

A tripod socket 21 is molded into a wall of bottom 12 to join case 10 by a bracket 22 to flashlamp 15. Such an arrangement shown in FIG. 8 allows remote operation. A belt clip 23 has a screw 24 that threads into tripod socket 21 for carrying case 10 on the belt of the cameraman.

Support brackets 25 and 26 are secured inside top 11 to support the control circuitry and mechanically strengthen case 10. The lower ends of brackets 25 and 26 are held firmly against the inside wall of top 11 by rivets 32 extending through the wall of top 11 and catchplates 33 for latch 13. The upper ends of brackets 25 and 26 are bent to extend outward through the wall of top 11 in slotted tabs forming strap anchorages 37 for a shoulder carrying strap. At the midsections of brackets 25 and 26, bent-out tabs 38 provide a support for board 39 holding circuit components.

Support bracket 25 has an opening 27 for receiving an on-off switch 28 that includes a neon lamp 42 and has an actuator button 29 extending through bracket 25 and aperture 30 in top 11. Screws 31 are driven through the wall of top 11, through bracket 25, and into the body of switch 28 to hold these elements firmly together. The upper end of bracket 26 has a square opening 34 that receives the body of socket 20, and a flange 35 of socket 20 is compressed between bracket 26 and the inside wall of top 11 by screws 36 driven through wall 11, flange 35, and brackets 26.

The construction built on brackets 25 and 26 provides solid and rugged joining of parts. Through latches 13 and catchplates 33, the weight of battery 14 is solidly hung on brackets 25 and 26 and supported by strap anchorages and a carrying strap. Socket 20 is firmly anchored against the force of inserting plug 19, and on-off switch 28 is securely held in place. Such a construction can withstand hard wear without failure.

Plug 19 and socket 20 are preferably made with one terminal inaccessible to touch when disconnected so that a charge on capacitor 16 in flashlamp 15 cannot shock a person handling plug 19 after it has been disconnected from socket 20.

Figure 7:
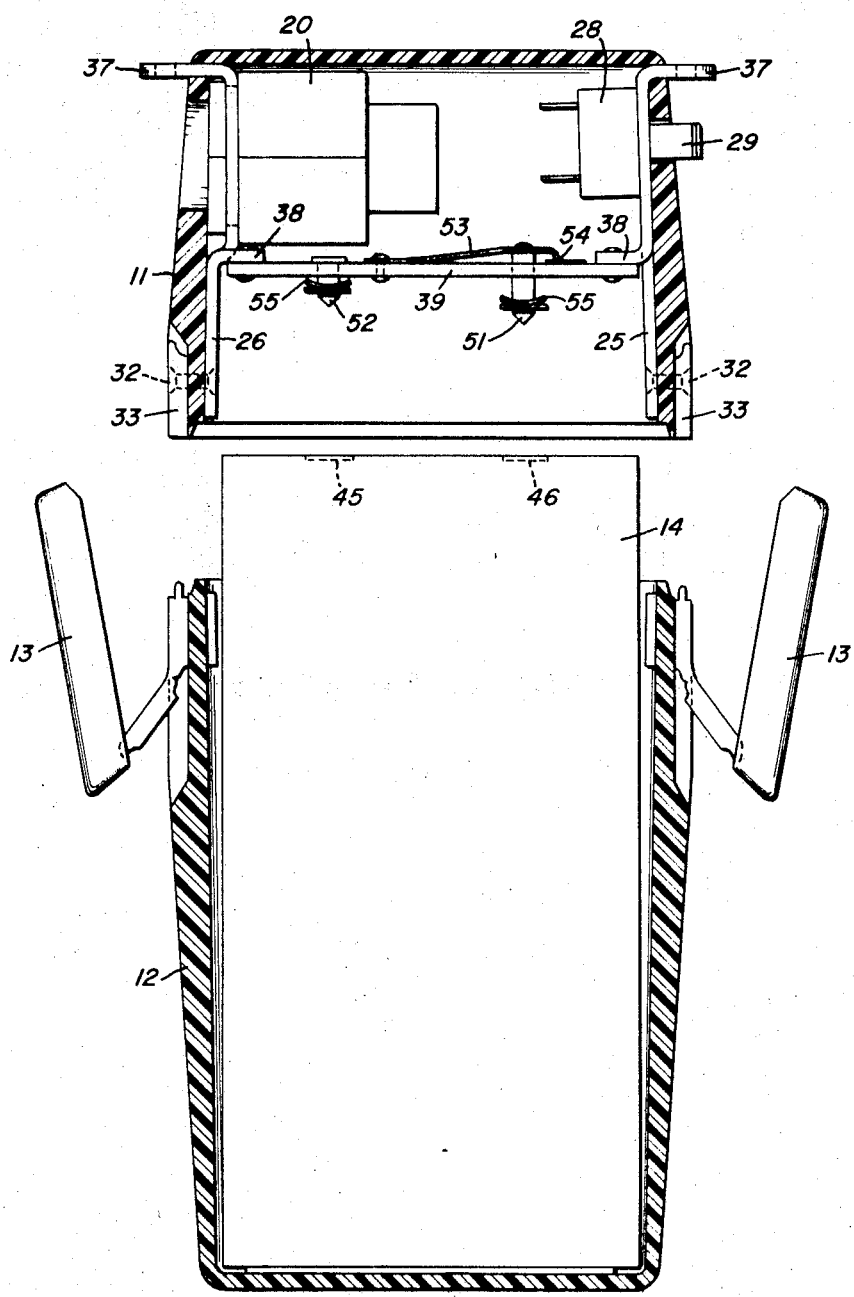
FIG. 7 shows the cross section view of FIG. 6 with the case unlatched and opened.
Figure 10:
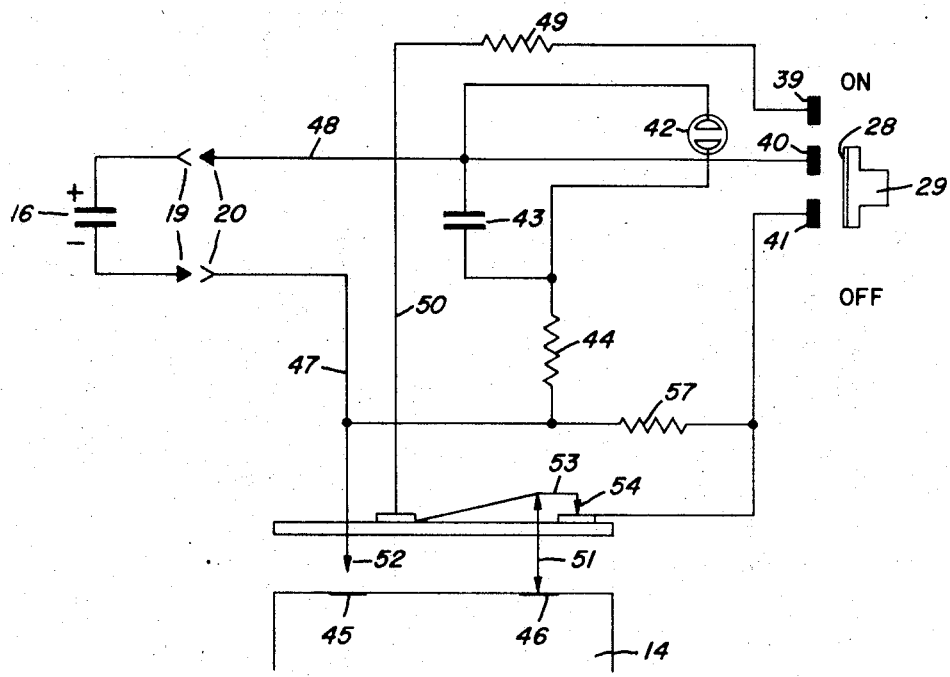
FIGS. 10 and 11 are schematic circuit diagrams of alternative circuits for use in the inventive power pack.

A preferred embodiment of control circuitry is shown in FIG. 10. On-off switch 28 has three contacts 39–41 and includes a neon lamp 42 arranged behind the translucent slide 29 to indicate that the power pack is on. Capacitor 43 and resistor 44 are connected with neon lamp 42 for an attention-getting indication that the power pack is on. Movable battery contact 51 is biased downward toward battery 14 by the resilient arm 53 of normally-open capacitor-discharge switch 54. When top 11 is secured to bottom 12 as best shown in FIG. 6, contact 51 is forced upward by battery 14 against the bias of resilient arm 53 to hold open switch 54. As top 11 is opened and moved from bottom 12, arm 53 biases contact 51 downward and closes switch 54 as best shown in FIG. 7. Spring washers 55 and 56 bias contacts 52 and 51 respectively downward from board 39 for firm engagement with battery terminals 45 and 46, and the additional downward bias of contact 51 by resilient arm 53 ensures that when top 11 is removed from bottom 12, contact 52 separates from terminal 45 before contact 51 separates from terminal 46. This ensures that battery 14 is disconnected from the control circuitry before switch 54 closes.

Referring again to the circuit of FIG. 10, when switch 28 is placed in the "on" position across contacts 39 and 40, capacitor 16 is charged through battery terminal 45, battery contact 52, line 47, line 48, switch contacts 40 and 39, resistor 49, line 50, arm 53, movable battery contact 51, and battery terminal 46. When switch 28 is moved on the "off" position, lamp 42 is extinguished and capacitor 16 discharges through line 48, contacts 40 and 41, normal-discharge resistor 57, and line 47. If switch 28 is left in the "on" position across contacts 39 and 40, such a discharge path is open. If case 10 is opened under such circumstances, switch 54 closes and the discharge path for capacitor 16 is through line 48, contacts 40 and 39, resistor 49, line 50, arm 53, switch 54, resistor 57, and line 47. Either discharge path empties capacitor 16 to make contacts 52 and 51 safe to touch.

Figure 11:
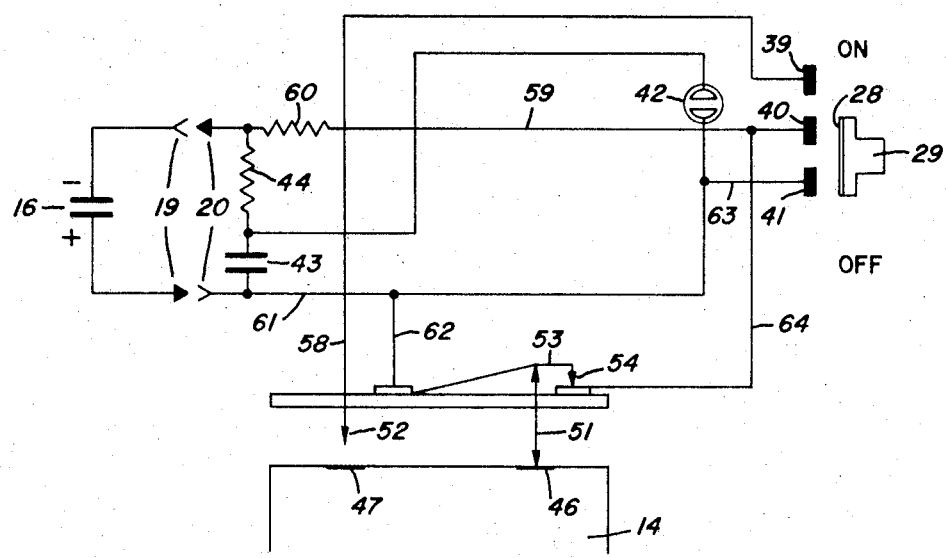

An alternative control circuit using a single capacitor-discharge resistor is shown in FIG. 11. In this circuit, capacitor 16 is charged through battery terminal 45, contact 52, line 58, contacts 39 and 40, line 59, resistor 60, line 61, line 62, arm 53, movable contact 53, and battery terminal 46. Resistor 44 and capacitor 43 flash neon lamp 42 as described for the circuit of FIG. 10. If the case 10 is opened with switch 28 in the "on" position across contacts 38 and 40, the discharge path for capacitor 16 is through resistor 60, line 59, line 64, switch 54, arm 53, line 62, and line 61. If switch 28 is moved to the "off" position, the discharge path for capacitor 16 is through resistor 60, line 59, contacts 40 and 41, line 63, and line 61.

It will thus be seen that the invention accomplishes its objects in providing automatic capacitor discharge to eliminate shock hazard, making the flash gun plug safe, providing an attention-getting warning light that the power pack is on, and embodying these features in a rugged durable and convenient case. Persons wishing to practice the invention should remember that other embodiments and variations can be adapted to particular circumstances. Even though one point of view is necessarily chosen in describing and claiming the invention, this should not inhibit broader or related applications within the spirit of the invention.

We claim:
1. A power pack for a photographic flashlamp having a storage capacitor and an electric cord for connection to said power pack, said power pack comprising:
   (a) a case having separable top and bottom portions releasably secured together;
   (b) a battery in said bottom portion;
   (c) control circuitry in said top portion;
   (d) a socket in said top portion for receiving a plug on said electric cord;
   (e) said plug having a high voltage terminal recessed so it cannot be touched in handling said plug;
   (f) a pair of contacts in said top portion arranged for engaging terminals of said battery when said case portions are secured together;
   (g) means for biasing one of said contacts for substantial movement toward said battery relative to the other of said contacts;
   (h) a biased switch arranged in said control circuitry to be held normally open by said biased contact when said biased contact is seated against one of said battery terminals with said case portions secured together, said biased switch being normally closed when said biased contact is not seated against one of said battery terminals;
   (i) said biased switch being arranged to dicharge said capacitor upon closure of said biased switch as said case portions are separated;
   (j) said circuitry including an on/off switch; and
   (k) said on/off switch being arranged in said off position to close a discharge circuit for said capacitor.

2. The power pack of claim 1 including a lamp for indicating the "on" condition of said power pack, and a relaxation oscillator arranged in said circuitry for flashing said lamp.

3. The power pack of claim 2 wherein said on/off switch is translucent and said lamp is arranged behind said on/off switch.

4. The power pack of claim 1 wherein said capacitor discharge circuit through said on/off switch, and the capacitor discharge circuit through said biased switch include a common resistor.

5. The power pack of claim 1 wherein the capacitor discharge circuit through said biased switch includes the "on" contacts of said on/off switch.

6. The power pack of claim 1 wherein said plug has a male terminal associated with said recessed terminal.

7. The power pack of claim 1 wherein said bias means for said biased contact comprises a spring arm of said biased switch.

8. The power pack of claim 1 including a pair of supporting brackets in said top portion arranged for supporting said control circuitry, and each of said brackets being configured to provide a carrying strap anchorage at one end and a latch anchorage at the other end.

9. The power pack of claim 8 wherein said socket is anchored in place by one of said support brackets.

10. The power pack of claim 9 wherein said on/off switch is anchored in place by the other of said support brackets.

11. The power pack of claim 10 wherein said case includes a tripod socket.

12. The power pack of claim 1 including a lamp for indicating the "on" condition of said power pack, a relaxation oscillator arranged in said circuitry for flashing said lamp, said plug has a male terminal associated with said recessed terminal, and said bias means for said biased contact comprises a spring arm of said biased switch.

13. The power pack of claim 12 including a pair of supporting brackets in said top portion arranged for supporting said control circuitry, each of said brackets being configured to provide a carrying strap anchorage at one end and a latch anchorage at the other end, said socket being anchored in place by one of said support brackets, and said on/off switch being anchored in place by the other of said support brackets.

References Cited

UNITED STATES PATENTS

| | | | |
|---|---|---|---|
| 2,358,796 | 9/1944 | Edgerton | 320—1X |
| 2,659,854 | 11/1953 | Wengel | 320—1 |
| 2,685,668 | 8/1954 | Ameele | 320—1 |
| 2,763,826 | 9/1956 | Friedman | 320—1 |
| 2,868,958 | 1/1959 | Bounds | 95—11.5 |
| 3,016,453 | 1/1962 | Van Der Mei | 240—1.3 |
| 3,077,534 | 2/1963 | Brandt | 240—1.3 |
| 3,288,044 | 11/1966 | Bramer | 95—11.5 |
| 3,333,093 | 7/1967 | Robinson | 240—1.3 |

TERRELL W. FEARS, Primary Examiner

U.S. Cl. X.R.

240—10.5; 307—150, 157